July 19, 1960   J. L. BOWER ET AL   2,945,527
DEFORMATION OF RESILIENT MATERIAL WITH
ELECTRONIC YIELD POINT DETERMINATION
Filed April 3, 1957   4 Sheets-Sheet 1

INVENTORS.
JOHN L. BOWER
KENNETH H. BEERS
BY
Allan Rothenberg
ATTORNEY

United States Patent Office 2,945,527
Patented July 19, 1960

2,945,527

DEFORMATION OF RESILIENT MATERIAL WITH ELECTRONIC YIELD POINT DETERMINATION

John L. Bower, Downey, and Kenneth H. Beers, Lakewood, Calif., assignors to North American Aviation, Inc.

Filed Apr. 3, 1957, Ser. No. 650,396

16 Claims. (Cl. 153—16)

This invention relates to methods and apparatus for the deformation of a resilient material and more particularly to methods and apparatus for straining a resilient workpiece in order to cause a specified dimension thereof to conform to a predetermined value.

Generally the deformation such as bending, compression, stretching or twisting of a resilient material such as, for example, a metal, is performed by a mechanical device operated by hand. Common methods of fabrication of structural parts include extrusion, pressing and rolling. For example, in an angulated metal shape produced by such methods of fabrication, the angle between the web and flange thereof is frequently insufficiently close to the value specified to permit the use of the part for certain purposes. In addition, heat treating of otherwise satisfactory parts often produces sufficient warping to cause the angles between flanges and webs to depart from satisfactory values. Thus, it is necessary in certain applications to correct a specified physical dimension of a fabricated part to a satisfactory value by handworking subsequent to the usual forming purposes.

In draw forming apparatus the workpiece is stretched beyond its elastic limit and shaped to conform with a die while in a semi-plastic state. The present invention may be applied for the purpose of determining when this state has been reached and forming can take place. Also contemplated is the application of the principles of this invention to compression machines such as cold rolling mills or other apparatus for reducing workpiece dimensions by cold compression.

While other applications are readily apparent, the invention is described herein as specifically applied to apparatus for automatically effecting a desired value of a specified dimension such as the angle between the web and the flange of a structural shape. Due to physical properties of metallic material, a permanent change of such specified dimension, i.e., permanent deformation, will not occur until after a certain minimum deformation has occurred, the deformation less than such minimum being lost by spring back. In accordance with this invention, this minimum deformation, herein defined as the yield strain of the workpiece, is detected and subtracted from the measured strain of the workpiece to obtain the value of the permanent strain therein. There is provided an actuator in the form of a mechanism adapted to grasp a portion of the workpiece to be deformed and means for generating a measured signal indicative of the position of the actuator with respect to a reference fixed relative to a second portion of the workpiece. A signal representing the desired value of a desired deformation of the workpiece is compared with the measured signal to obtain an error signal indicative of the difference between the actual dimension and the desired dimension. This difference signal is stored and its sign is utilized to control the actuator to cause the deformation of the workpiece in the desired direction. As the workpiece is strained, the value of the measured signal at the yield strain thereof is noted and subtracted from the subsequently increasing value of the measured signal which thus yields an absolute corrected value. The absolute corrected value is compared with the stored error value and when the two are equal, the permanent strain of the workpiece has reached the desired value and the actuator is caused to be stopped. The yield strain or yield point of the workpiece is sensed by causing the material to be strained at a constant time rate at least up to the yield point of the workpiece where there occurs a discontinuity in either the value of the force applied by the actuator or in the speed of a constant torque motor which may be utilized to drive the actuator. The discontinuity occurs at the yield point of the workpiece and may be utilized to produce a signal which initiates the measurement of the correcting or permanent strain of the workpiece. Since the yield point is detected by sensing a discontinuity in the rate of change of bending force with respect to the strain of the workpiece, it is desirable to electrically differentiate a signal representative of the force with respect to a signal representative of the strain. This is achieved by maintaining a constant time rate of change of strain whereby the derivative of force with respect to time, which may be obtained by a simple electrical operation, is proportional to the derivative of the force with respect to strain.

It is an object of this invention to provide the automatic deformation of resilient or elastic material.

A further object is to provide apparatus for producing in a resilient workpiece permanent deformation within specified tolerances.

Another object is the correction of a specified dimension of a resilient workpiece by automatic means.

Still another object of this invention is the automatic measurement and correction of the error in an angular dimension of a structural shape.

A further object of this invention is the provision of apparatus for comparing a specified dimension of a workpiece with a desired value of such dimension and automatically correcting for the difference between the measured and desired value of such dimension within a prescribed tolerance.

A further object of this invention is the detection of the yield point of a resilient material.

A still further object is the electrical differentiation of a dependent variable with respect to an independent variable other than time.

Other objects of the invention will become apparent from the following description taken in connection with the accompanying drawings, in which.

Figure 1:
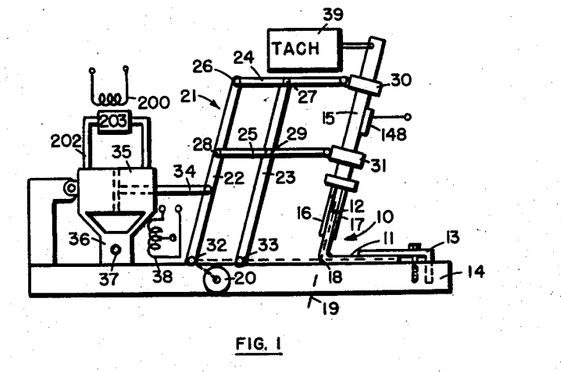
Fig. 1 is a schematic representation of the physical structure of an actuating mechanism which may be utilized in accordance with the principles of this invention for the correction of structural angles.

As illustrated in Fig. 1, the structural shape such as a fabricated flanged part 10 having a web 11 and flange 12 forming an angle which is desired to be measured and corrected to conform with a desired value, is secured by a clamp 13 to a reference such as a fixed work table 14. It is desired to bend the flange 12 until after release it makes the proper angle with the web 11. A finger mechanism comprising shaft 15 carries a pair of fingers 16 and 17 which are adapted to be connected with or grasp the flange 12 of the workpiece. Conveniently, the fingers 16 and 17 may be mutually spaced by a distance substantially equal to the thickness of the flange 12 whereby the workpiece may be grasped simply by sliding the flange between the fingers. The finger mechanism is mounted for rotation about axis 18, the intersection of the center lines of the web and flange and may also rotate about axis 19, the intersection of a plane containing the center lines of the fingers and the center of the flange 12. Thus, the angle which either finger of the shaft thereof makes with the reference is equal to the angle which the flange makes with the web. If the finger mechanism is mechanically actuated, a position sensing device such as the potentiometer 20 will then produce a signal indicative of the angle between the web and the flange which signal may be compared with a signal indicative of a desired angle. The finger mechanism is driven by a constrained linkage 21 comprising two pairs of levers 22, 23, and 24, 25 pivotally interconnected at 26, 27, 28 and 29. Levers 24 and 25 are respectively pivoted to sleeves 30 and 31 in which shaft 15 is slidably and rotatably engaged. Levers 22 and 23 are pivoted to the reference 14 about axes 32 and 33 lying in the center plane of the web 11. Potentiometer 20 is most conveniently driven by rotation of lever 22 through a mechanical connection to the pivot 32 thereof although other potentiometer drive arrangements are obviously available. A driving piston 34 is pivoted to lever 22 and mounted in cylinder 35 which is supplied with a fluid under pressure through a conventional control valve 36 from a supply line 37. The valve is actuated in either direction to cause the piston 34 to move in the desired direction in accordance with the current in a split driving coil 38 as is well known in the art. A shunt conduit 202 is controlled by normally closed shunt valve 203 which is opened by energization of coil 200, upon completion of the desired correction. Thus the piston and linkage may assume an at rest position. A tachometer 39 is also connected to be driven by the finger mechanism for purposes to be described hereinafter.

The difference between the measured signal, the output of potentiometer 20, and the desired value defines the value which is the error in the specified dimension (the angle beteween flange 12 and web 11) and the sign and magnitude of this error indicates the correction to be made to the specified dimension in order to bring it to the desired value.

If the fingers are actuated to cause them to rotate about axis 18 in a direction determined by the sign of the error, the flange will bend in the proper direction to bring the angle to the desired value. However, due to the physical properties of the structural metal, permanent deformation of the workpiece will not occur until a certain minimum deformation has taken place.

Figure 2A:
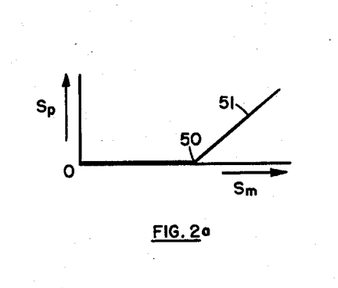
Figs. 2a, 2b, 2c and 2d graphically illustrate the relation between the strain of the workpiece and other quantities of interest.

Fig. 2a qualitatively shows the relation between the maximum strain or deformation $S_m$ and the permanent deformation or strain $S_p$ (the difference between them being commonly referred to as spring back). Point 50 of curve 51 of Fig. 2a indicates the yield point of the workpiece and also indicates the value of the maximum strain (the actual deformation which has occurred) of the workpiece. The strain at point 50, herein defined as the yield strain of the workpiece, is the dividing point between a lesser strain which is directly proportional to the stress in the workpiece and the force applied thereto (since the material follows Hook's Law up to point 50) and a greater strain which occurs beyond the yield point of the material. At point 50 permanent deformation commences.

Figures 2B, 2D:
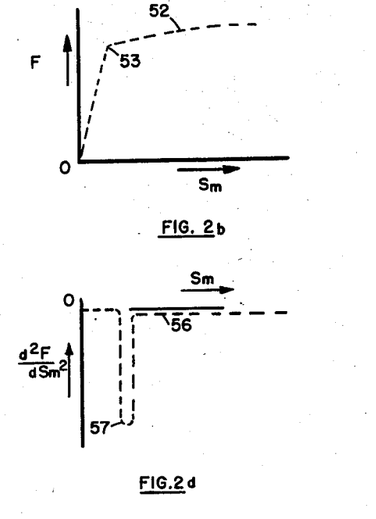
Figure 2C:
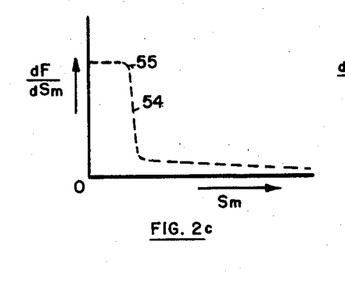

Fig. 2b qualitatively shows the relation 52 between the maximum strain and the force, F, required to perform the deformation. It can be shown that the point 53 at which the curve 52 becomes nonlinear and the point 50 of Fig. 2a occur at the same values of maximum strain. Point 53 can be located by either of two methods, both of which make use of the discontinuity in the rate of change of the force required to produce the strain with respect to the strain. If the slope $dF/dSm$ of the curve 52 is plotted as a function of the strain, the resultant curve 54 would be as shown in Fig. 2c. Point 55, the point at which the force rate is suddenly reduced, thus identifies points 50 and 53, the yield strain of the material. Alternatively, the slope of the curve 54, $d^2F/dSm^2$, may be plotted as a function of the strain to provide the curve 56 which becomes suddenly negative at point 57, thus identifying the yield strain of the material. Any strain in excess of the strain at point 50 will result in a permanent strain which is substantially equal to such excess.

Figure 3:
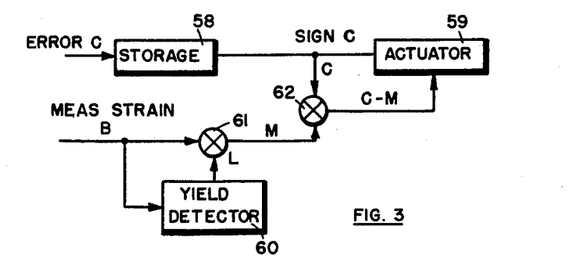
Fig. 3 comprises a functional diagram of the invention.

Referring now to Fig. 3, the sign and magnitude of the error C, the difference between the measured dimension and the desired dimension are noted and stored in a storage device 58. The sign of the error is utilized to control the direction of the motion of the finger actuator 59 such that the error will be reduced. When the actuator begins its operation, the error is no longer noted but rather the measured dimension B, which is now changing, is diverted into a yield detector circuit 60 which detects the yield strain L at point 50 as described above. When the yield strain is detected, the measured value is fed to a comparator 61 which subtracts the yield strain from the measured strain to produce a corrected strain value M equal to the strain beyond the yield strain. The corrected strain M is compared with the error C in comparator 62 and when the values of C and M are equal in magnitude, the permanent strain of the workpiece will be at a satisfactory value. Equality of the signals C and M is utilized to stop the actuator 59.

Figure 4:
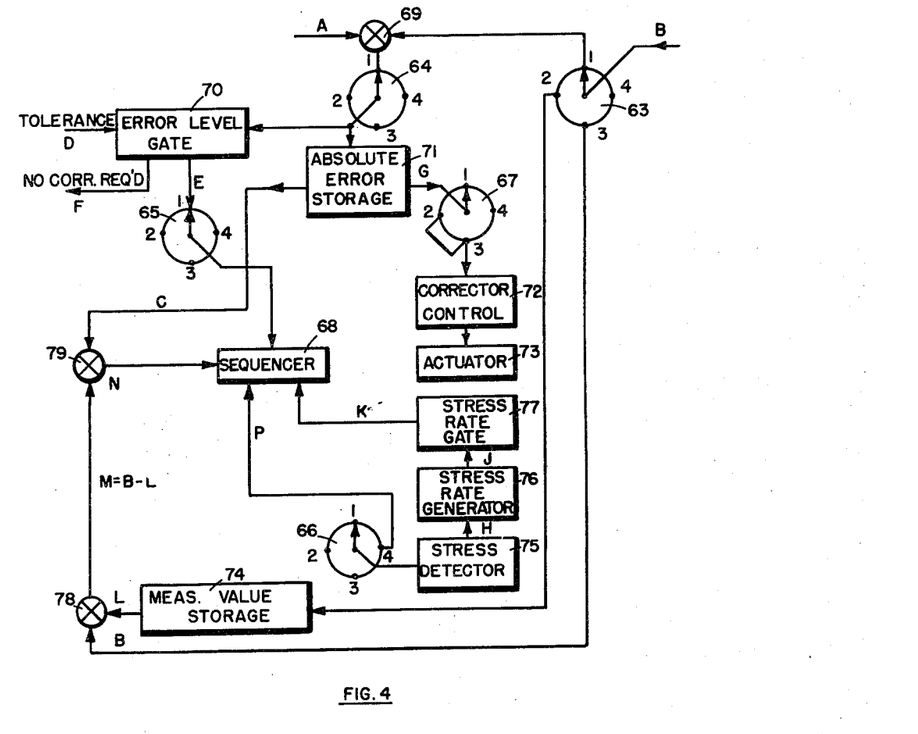
Fig. 4 is a block diagram of the electrical components of one form of the invention.

As indicated in Fig. 4, the sequencing of the desired operations is effected by the several banks 63 through 67 of a four position stepping switch, the banks of which move in unison through positions 1, 2, 3 and 4 in sequence at times determined by the energization of the stepping switch sequencer 68. It is to be understood that suitable mechanical connections, not shown, are provided between the sequencer and the switch banks. Initially, the stepping switch and each bank thereof is in position 1 and the desired value, quantity A and measured value, quantity B, are compared in comparator 69 from which the difference or error, quantity C, is fed through switch bank 64 to error level gate 70 and absolute error storage device 71. The error quantity C and a specified tolerance quantity D are compared in error level gate 70 which produces a signal F if the error is less than the specified tolerance. If the error is greater than the specified tolerance, the gate 70 produces a correction required signal E which is transmitted through switch bank 65 to the sequencer 68. The no correction required signal F may be utilized simply for an indication or to provide appropriate action such as the moving of the measuring and correcting operation to another station on the same or other workpiece.

With the switch banks in position 2 due to the transmission of the signal E to the sequencer 68, an error sign signal, quantity G, is transmitted through switch bank 67 to corrector control 72 (which may include coil 38 of Fig. 1) which causes the actuator 73 (the described finger mechanism) to move in such a direction as would reduce the error. The measured signal B is now transmitted from step 2 of switch bank 63 to the measured value complement storage 74 which produces a signal L indicative of the measured value at the yield strain of the workpiece. A stress detector 75 (which may be strain gage 148 of Fig. 1) is at this time transmitting a stress signal, quantity H, to the stress rate generator 76 which computes either the first or second derivative, quantity J, of the stress H with respect to time. The rate of movement of the actuator and, therefore, the strain rate is held constant as described below whereby the second derivative of stress H with respect to strain is directly proportional to the second derivative of stress with respect to time. Since the stress in the actuator is directly proportional to the applied force, the quantity J represents the curve 56 of Fig. 2d. A discontinuity in the quantity J is detected by stress rate gate 77 which identifies the yield strain, point 50 of Fig. 2a, as described above and transmits a correction started signal, quantity K, to the sequencer 68 causing the stepping switch banks to move to position 3.

In position 3, the actuator 73 continues to move as described above, but the measured value B is now transmitted through step 3 of bank 63 to comparator 78 where it is compared with the stored measured value, quantity L and absolute corrected value, quantity M, (indicative of the strain beyond the yield strain) is transmitted from the comparator 78 to a second comparator 79. In comparator 79 the absolute error quantity C is compared with the difference M between the measured quantity B and the yield quantity L to produce a signal N when the quantity C is equal to the quantity M. With the occurrence of the signal N the correction has been completed and the signal N is fed to sequencer 68 causing the switch banks to move to position 4.

In position 4 the corrector control 72 is de-energized (by bank 67) and the actuator 73 stops. The workpiece is relieved of applied force and returns to an unstressed position through its spring back. When the actuator is completely released, a material unstressed signal, quantity P, is transmitted from the stress detector 75 through step 4 of switch bank 66 to the sequencer 68 whereby the switch banks move again to position 1. In position 1, the initial operation of comparing the error quantity C with the tolerance quantity D is repeated thus checking to determine whether the correction was adequate.

Figure 5:
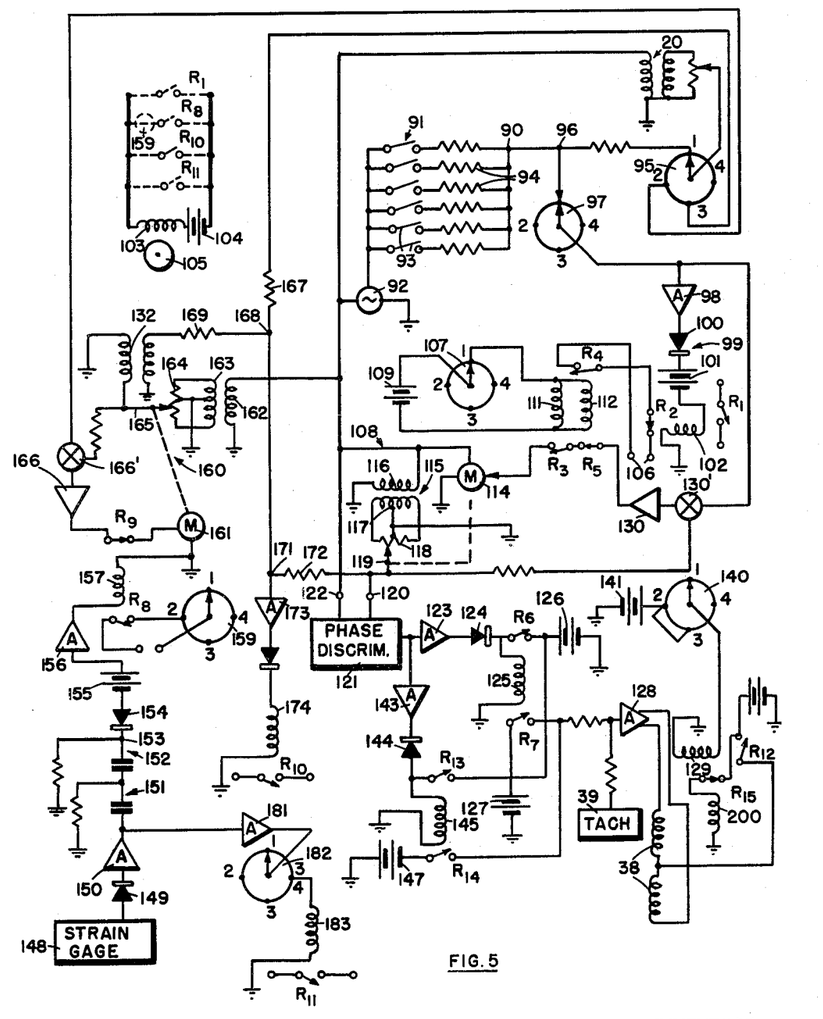
Fig. 5 is a schematic circuit diagram of the invention illustrated in Fig. 4.

Fig. 5 is a detailed schematic illustration of circuitry for obtaining and operating upon the signals described in connection with the block diagram of Fig. 4. An electric analog signal indicative of the desired quantity A is obtained at point 90 from a summing network 91 which is energized from an alternating current source 92 through a plurality of switches 93 thereof. The resistors 94 of the network 91 are weighted in accordance with a digital code whereby the closing of a desired switch or combination of switches 93 will provide at point 90 the analog of digital information which indicates the desired dimension of the workpiece. The switches 93 may be closed manually or may comprise a portion of a punched card read-out which will accept information from a conventional IBM card. The potentiometer 20 energized from source 92 has its movable arm actuated by a suitable pivot of the finger mechanism as indicated in Fig. 1 whereby the signal B appearing on the potentiometer arm will have a magnitude indicative of the actual position of the relatively movable portion 12 of the workpiece with respect to the relatively fixed portion 11 thereof. The potentiometer 20 is arranged to provide the signal B with a polarity opposite to the polarity of the source 92 and desired quantity A whereby as the signal B is transmitted through step 1 of switch bank 95 and added at point 96 to the desired quantity A, the error signal C which is obtained via step 1 and the movable contact of switch bank 97 will have a magnitude indicative of the difference between the desired dimension and the measured dimension and a polarity indicative of the sign of the error. The error signal C is transmitted through amplifier 98 to the error level gate 99 comprising diode 100 biased by battery 101 which provides the specified tolerance quantity D. If the magnitude of the error signal C exceeds the bias tolerance D, current flows through coil 102 closing normally open relay contacts R1 which complete a circuit through sequencer coil 103 and battery 104 (shown in the upper left corner of the figure) to actuate sequencer 105 and cause the switch banks to step from position 1 to position 2.

If the error signal C from amplifier 98 is not greater than the bias tolerance D, normally closed relay contacts R2 are not opened and a circuit including terminals 106 is closed to provide a no correction required signal. The circuit connected with stepping switch bank 107 provides the starting cycle for the absolute error storage circuit 108. In step 1, battery 109 energizes coil 111 to close normally open relay contacts R3 thus closing the input circuit to the storage device 108. Relay coil 112, provided with an inherently delayed operation, closes normally open relay contacts R4 and opens normally closed contacts R5 whereby the input circuit to the storage device 108 is opened after the lapse of a sufficient time to allow the storage device to accumulate the error signal. Relay coil 102 is provided with a delay substantially equal to or just less than the delay of coil 112 in order to allow the error signal to be noted and stored before the actuation of the stepping switch banks.

The absolute error storage device 108 comprises a two phase motor 114 having its field energized from the alternating-current source 92 and its control winding fed with the error signal C from switch bank 97 through relay contacts R5 and R3 and amplifier 130 which provides a phase quadrature output. A potentiometer 115 comprises a primary winding 116 energized from source 92 and inductively coupled to secondary winding 117 across which is coupled resistor 118. Winding 117 and resistor 118 are center tapped and connected to ground while movable arm 119 is mechanically driven in either direction from the center tap of resistor 118 in an amount and direction in accordance with the magnitude and direction of rotation of the output shaft of motor 114 which in turn is driven in an amount and direction in accordance with the magnitude and polarity of the error signal C. Thus, the voltage on arm 119 of the potentiometer has a magnitude and polarity indicative of the magnitude and sense of the error signal. This voltage is fed back to summing network 130' at the input of amplifier 130 in opposition to signal C derived from bank 97 whereby when the voltage at 119 is equal to the error C, the motor ceases to drive the potentiometer arm which thus remains at a position indicating the error signal and the latter is stored.

It is in step 2 that the straining of the workpiece is initiated. When step 1 has been completed as above described and a signal E indicating an error in excess of the allowed tolerance is transmitted to sequencer 105 by R1 and coil 103, all of the ganged switch banks move to position 2 as described in connection with Fig. 4. Under these conditions, the error signal C from the arm 119 of storage device 108 is presented at terminal 120 of phase discriminator 121 which also has applied thereto at terminal 122, the alternating-current reference from source 92. The output of the phase discriminator which has a sign in accordance with the relative polarity of the signals applied at terminals 120 and 122 is fed through either of a pair of substantially similar driving circuits. The positive circuit comprises amplifier 123 connected to feed a positive signal through diode 124 for the energization of coil 125 which, when energized, closes normally open relays R6 and R7. Closing of relay R6 allows a direct current source 126 to take over and maintain the energization of coil 125 whereby relay R7 will remain closed and transmit the signal from source 127 through driving amplifier 128, driving coil 38 and normally open relay R12 which at this time is closed by the energization of coil 129 through step 2 of switch bank 140 and battery 141. The transmission of a signal through amplifier 128 and R12 energizes driving coil 38 which as described in connection with Fig. 1, actuates the control valve 36. Amplifier 128 has a single ended input and a push-pull output whereby current flows through the sections of the split coil 38 in accordance with the polarity of the amplifier input. The negative circuit comprises amplifier 143, diode 144, coil 145, source 147 and associated relay contacts R13, R14 connected and arranged as are elements 123, 124, 125, 127, R6 and R7 of the positive circuit with the connections of the diode 144 and source 147 reversed with respect to the connections of the diode 124 and source 127. Thus, if the output of the phase discriminator 121 is negative, a negative signal from the battery 147 is fed to the amplifier 128 to produce a net current through driving coil 38 which is opposite in direction to the net current produced by positive output from the phase discriminator. As is well known in this conventional type of valve, the valve armature (not shown) is positioned between the coil sections and moved into accordance with the amplifier output. Thus the direction of the bending of the flange 12 will be governed by the direction of the net flow of current through the two halves of driving coil 38 which in turn is determined by the phase of the error signal C. Tachometer 39 (Figs. 1 and 5), is mechanically coupled to the actuator mechanism and provides a signal proportional to the velocity of the actuator mechanism which is in turn proportional to the time rate of strain of the workpiece. This strain rate output of the tachometer is degeneratively fed back to the input of driving amplifier 128 whereby a constant rate of movement, a constant strain rate, is obtained by reason of the fact that both magnitude and direction of movement of valve 36 is controlled by the current in coil 38.

Strain gage 148 (Figs. 1 and 5), may conventionally comprise an alternating current excited resistance sensitive to the strain in the shaft 15 which is proportional to the force supplied due to the fact that the shaft actuator mechanism never approaches is yield point. The stress signal H is rectified in diode 149, amplified in amplifier 150 and twice differentiated in a pair of resistance capacitor differentiators 151 and 152. The differentiators, of course, provide an output which is the second derivative of the magnitude of stress H with respect to time. However, due to the feed back provided by tachometer 39, the strain rate is held constant and therefore the second derivative of stress with respect to time is proportional to the second derivative of stress with respect to strain. As indicated in Fig. 2d, the yield strain is indicated by the sudden negative value of the second derivative of applied force with respect to strain. The applied force is, of course, proportional to the strain in the actuator mechanism whereby the signal produced at point 153, the output of the differentiators, follows the desired rate of change of force rate with respect to the strain $S_m$ of the workpiece. Thus, at point 153, there is produced the second derivative of the dependent variable H with respect to the independent variable B.

The signal J at point 153, which may alternatively be provided by a single differential in accordance with curve 54 of Fig. 2c, is sent through the stress rate gate which comprises diode 154 biased by battery 155 whereby a negative or decreased value of quantity J will cause the amplifier 156 to conduct current through coil 157 and close normally open relay contacts R8 which together with switch bank 159 in position 2 effect the energization of sequencer coil 103 to cause the stepping switches to move from position 2 to position 3. Relay R8 releases slowly enough to allow sufficient time for stepping of the switch banks. With the closing of contacts R8, the yield strain of the workpiece has been reached and the actual correction is started. While still in position 2, switch bank 95 to which is fed the measured signal B from potentiometer 20, transmits to the measured value complement storage device 160, the actual measured value B. The storage device 160 is substantially similar to storage device 108 and comprises a motor 161, potentiometer coils 162, 163, resistor 164, potentiometer arm 165, amplifier 166, and feed back summing network 166′, all connected and arranged as are the similar elements of storage device 108. The signal B fed from step 2 of switch bank 95 is applied to motor 161 through normally closed relay contacts R9 which are opened together with the closing of R8 by the energization of coil 157 when the yield strain has been reached. Thus, the signal on arm 165 will remain at the value indicative of the yield strain. The signal L which is the negative of the value of B at the yield point is obtained from potentiometer arm 165 through transformer 132 which reverses the polarity of the signal stored on arm 165.

In the step 3 the actuator continues to operate as in step 2, but will be stopped at the end of this step when the correction is completed. The measured value B is now derived from step 3 of switch bank 95 and fed through one input resistor 167 of a summing network or comparator 168 which has a second input resistor 169 which receives the signal L, the negative of the stored yield strain value. The output of comparator 168 is fed to a second summing network or comparator 171 which has an input resistor 172 thereof fed with the absolute stored error value C provided at arm 119 of storage device 108. Thus in comparator 171 the stored error signal C is compared with the magnitude of the correction strain beyond the yield strain and when the two values are equal, amplifier 173 will cause a current to be conducted through coil 174 and close normally open contacts R10 whereby sequencer coil 103 is energized and the stepping switch banks are moved from position 3 to position 4.

In step 4, the correction has been completed and the actuator is now released to return the stepping switches to step 1. When stepping switch 140 is at position 4, coil 129 is de-energized, R 12 is opened, contacts R15 are closed, driving coil 38 is de-energized and shunt-valve coil 200 is energized to open valve 203 whereby the movement of the actuator is stopped. There is no longer any force applied and the stress signal H from amplifier 150 decreases. When this signal decreases to zero, amplifier 181 provides a material unstressed signal which is fed through switch bank 182 in position 4 thereof through coil 183 to close relay contacts R11 and move the stepping switch banks back to position 1 where the operation of step 1 is repeated.

It is to be understood that the contacts R1, R8, R10 and R11 and switch bank 159 are each electrically connected across coil 103 and battery 104 as indicated in dotted lines, and that the sequencer 105 is mechanically coupled with the movable arm of each of switch banks 95, 97, 107, 140, 182 and 159. These electrical and mechanical connections which are believed to be self-evident have been omitted from the drawing for purposes of clarity.

It will be readily appreciated that the constant strain rate provided by the described arrangement of feedback tachometer 39 and amplifier 128 may alternatively be provided by a constant flow rate pump which feeds an incompressible fluid at a constant flow rate to the piston, as is well known in the art.

Figure 6:
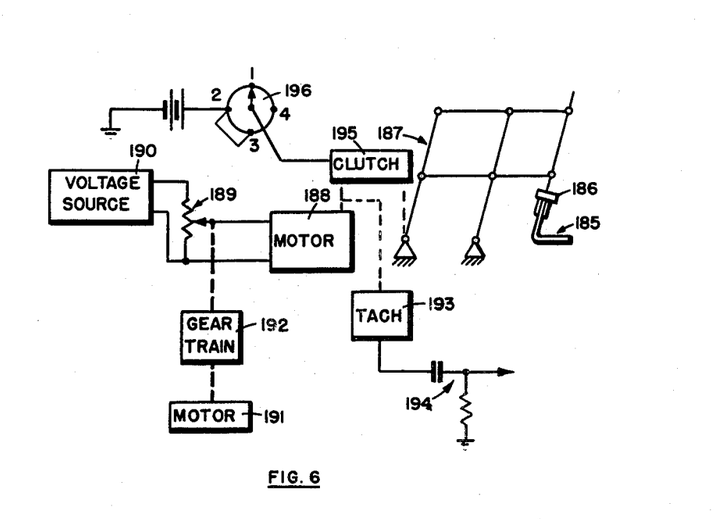
Fig. 6 illustrates a modified form of actuator drive.

While there has been described a method which utilized a constant rate of movement of the actuator mechanism for obtaining the yield point of the workpiece, it will be readily appreciated that other methods of sensing a discontinuity in stress or strain may be utilized. One such alternative apparatus and method for sensing the yield strain is indicated in Fig. 6 wherein the workpiece 185 is grasped by a finger mechanism 186 actuated by a constrained linkage 187 substantially similar to the structure shown in Fig. 1. In this arrangement, however, the constrained linkage 187 is driven through clutch 195 by a motor 188 which produces a torque which is directly proportional to the control voltage applied thereto. A linearly increasing control voltage (a voltage having a constant time rate of change), is derived from potentiometer 189 energized from a voltage source 190 and having the movable arm thereof driven at a constant speed by a constant speed motor 191 and gear train 192. In this arrangement, the strain gage 148 of Fig. 1 is not required and a tachometer 193 has its input coupled with the output shaft of motor 188 to provide an electrical output indicative of motor speed which may be fed through resistance capacitor differentiator 194 to the input of the stress rate gate at terminal 153 (Fig. 5). Due to the constant speed of motor 191, the linearly increasing voltage from potentiometer 189 is fed to motor 188 to provide at the output shaft thereof a torque which linearly increases with time. The linearly increasing torque creates a constant strain rate or velocity of the output shaft of motor 188 since the applied torque is directly related to the stress in the finger mechanism 186. This relation holds up to the yield point of the workpiece at which time the time rate of change of the applied force suddenly decreases and a sudden increase in the velocity (a velocity discontinuity), of the output shaft of motor 188 occurs. The velocity discontinuity which occurs at the yield strain of the workpiece is manifested by a sudden increase in the D.-C. current output of tachometer 193 which sudden increase may be sharpened by differentiator 194 from whence it is applied through the stress rate gate 154, 155, and amplifier 156 to energize coil 157, close R8 and step the switches to position 3 in the manner and for the purpose described in connection with Fig. 5. In this arrangement the clutch 195 which is energized during steps 2 and 3 will be de-energized in step 4 by switch bank 196 whereby release of applied force is effected.

It will be readily appreciated that the actuator drive of Figs. 1 and 5 may also be replaced by a constant speed motor connected through a clutch and suitable gearing to drive the constrained linkage 21 at a fixed speed. As in Fig. 6, the clutch will be de-energized by movement of the switch banks to step 4.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A method for determining the yield point of a resilient material comprising the steps of applying a deforming force to said material, maintaining a constant rate of deformation of said material, providing a signal proportional to said deforming force, and electrically differentiating said signal.

2. A method for determining the yield point of resilient material comprising the steps of applying an increasing force to said material to effect an increasing strain and a stress therein, controlling the application of said force to prevent variation of the time rate of change of said strain, providing a signal indicative of said stress, and electrically differentiating said signal.

3. Apparatus for straining a resilient workpiece through its yield strain to produce a predetermined amount of permanent strain therein comprising actuating means for straining said workpiece to produce a correction strain therein, means for generating first and second signals respectively indicative of said yield and correction strains, comparison means responsive to said first and second signals for generating a correction signal indicative of the amount by which said correction strain exceeds said yield strain, means for generating an error signal indicative of said predetermined amount of permanent strain, and means responsive to the relation between said error and correction signals for stopping said actuating means.

4. Apparatus for straining a resilient workpiece through its yield strain to produce a predetermined permanent position of a relatively movable portion of said workpiece with respect to a relatively fixed reference portion thereof comprising means for generating a position desired signal indicative of said permanent position, measuring means for producing a measured signal indicative of the actual position of said movable workpiece portion with respect to said reference portion, means for comparing said signals to produce an error signal, means for storing said error signal, actuator means responsive to said comparing means for straining said workpiece to cause said actual position to approach said permanent position, whereby a correction strain related to the change in said actual position is produced in said workpiece, means for producing a correction signal indicative of the amount by which said correction strain exceeds said yield strain, and means responsive to said correction and error signals for stopping said actuator means.

5. The apparatus of claim 4 wherein said correction signal producing means comprises means for producing a yield signal indicative of said actual position at said yield strain, and means for comparing said measured signal with said yield signal to produce said correction signal.

6. The apparatus of claim 5 wherein said yield signal producing means comprises means for producing a signal indicative of the time rate of change of stress in said workpiece, and means including said actuator means for maintaining a constant time rate of change of strain of said workpiece.

7. Apparatus for correcting the angular relation between the flange and web of an angular structural shape comprising actuator means adapted to be connected with said structural shape, measuring means for generating a measured signal proportional to the angular relation of said actuator means with respect to a reference, means for comparing the initial value of said measured signal with a signal proportional to a desired angular relation of said flange and web to produce an error signal having a magnitude and polarity representing the magnitude and direction of the difference between said desired and measured angular relations, means for storing said error signal, control means responsive to the polarity of said error signal for driving said actuator at a constant rate whereby the value of said measured signal is varied, yield means for generating a signal indicative of the rate of change of stress in said structural shape, means responsive to said yield means for storing the value of said varying measured signal when said rate of change of stress changes, means for comparing said varying measured signal with the stored value thereof to produce a correction signal, means for comparing said correction signal with said stored error signal, and means responsive to said last named comparing means for de-actuating said control means to stop said actuator means.

8. The apparatus of claim 7 including tolerance means for comparing said error signal with a tolerance signal proportional to a predetermined maximum allowable error of said angular relation of said structural shape, and means responsive to said tolerance means for controlling the actuation of said control means.

9. Apparatus for correcting a physical dimension of a resilient workpiece comprising actuator means adapted to grasp a portion of said workpiece, measuring means for generating a measured signal indicative of the position of said actuator means with respect to a reference fixed relative to a second portion of said workpiece, a first comparator adapted to receive a signal indicative of a desired dimension of said workpiece, first switch means for coupling said measured signal to said comparator, error storage means, second switch means for coupling said comparator to said storage means, means responsive to said storage means for driving said actuator means to strain said workpiece and change said physical dimension, measured signal storage means, means responsive to said comparator for opening said second switch means and for switching said measured signal to said measured signal storage means, yield means for generating a signal indicative of the rate of change of stress in said workpiece, a second comparator coupled with said measured signal storage means, means responsive to said yield means for switching said measured signal to said second comparator, and means responsive to said error storage means and said second comparator for stopping said actuating means.

10. A method for electrically differentiating a first quantity with respect to a second quantity other than time where variations of said first quantity depend upon variations of said second quantity comprising the steps of effecting a constant rate of change of said second quantity with respect to time, generating a signal indicative of the magnitude of said first quantity as said second quantity varies, and electronically differentiating said signal with respect to time.

11. A method for electronically determining the rate of change of a dependent variable with respect to change of an independent variable other than time comprising the steps of maintaining a constant time rate of change of said independent variable, generating an electric signal indicative of the magnitude of said dependent variable as said independent variable changes, and electrically differentiating said signal with respect to time.

12. A method for determining the yield point of resilient material comprising the steps of applying a linearly increasing force to said material to effect an increasing strain and stress therein, producing a signal indicative of said strain, and differentiating said signal with respect to time.

13. A method for electrically determining the yield point of a resilient material comprising the steps of effecting in said material a constant rate of change of stress with respect to time, generating a signal indicative of the magnitude of said stress, and electronically differentiating said signal with respect to time.

14. A method for electrically determining the yield point of a resilient material comprising the steps of effecting a constant time rate of change of deformation of said material, generating an electric signal indicative of the magnitude of the stress in said material as deformation changes, and electrically differentiating said signal with respect to time.

15. Apparatus for straining a resilient workpiece through its yield strain to produce a predetermined amount of permanent strain therein comprising means for generating an error signal indicative of said predetermined amount of permanent strain, actuating means responsive to said error signal for straining said workpiece, means for generating a measured signal indicative of the actual strain in said workpiece, means for generating a yield signal indicative of the yield strain of said workpiece, means responsive to said measured and yield signals for producing a correction signal indicative of the amount by which said actual strain exceeds said yield strain, and means responsive to the relation between said error and correction signals for stopping said actuating means.

16. Apparatus for correcting a physical dimension of a resilient workpiece comprising actuator means adapted to grasp a portion of said workpiece, means for producing an error signal indicative of a desired correction of said workpiece, means responsive to said error signal for driving said actuating means, means for generating a measured signal indicative of the position of said actuator means relative to a reference, measured signal storage means for receiving and storing said measured signal, a comparator coupled to receive the output of said storage means, means for determining the yield point of said workpiece, means responsive to said determining means for switching said measured signal to said comparator, and means responsive to said comparator and said error signal for stopping said actuating means.

References Cited in the file of this patent

UNITED STATES PATENTS

| | | |
|---|---|---|
| 2,081,599 | Peters | May 25, 1937 |
| 2,364,989 | Mallina | Dec. 12, 1944 |
| 2,426,390 | De Forest | Aug. 26, 1947 |
| 2,445,683 | Macgeorge | July 20, 1948 |
| 2,555,633 | Comins | June 5, 1951 |
| 2,557,947 | Deakin | June 26, 1951 |
| 2,615,490 | Marcy | Oct. 28, 1952 |
| 2,702,473 | Dames | Feb. 22, 1955 |

UNITED STATES PATENT OFFICE
CERTIFICATE OF CORRECTION

Patent No. 2,945,527                        July 19, 1960

John L. Bower et al.

It is hereby certified that error appears in the printed specification of the above numbered patent requiring correction and that the said Letters Patent should read as corrected below.

Column 7, line 50, for "differential" read -- differentiation --.

Signed and sealed this 3rd day of January 1961.

(SEAL)
Attest:

KARL H. AXLINE
Attesting Officer

ROBERT C. WATSON
Commissioner of Patents